(12) United States Patent
Maheshwari et al.

(10) Patent No.: US 10,327,109 B1
(45) Date of Patent: Jun. 18, 2019

(54) METHODS AND SYSTEMS FOR LOCATION DETERMINATION OF A MOBILE DEVICE USING PARTIAL RF BANDS

(71) Applicant: QUALCOMM Incorporated, San Diego, CA (US)

(72) Inventors: Ankit Maheshwari, Hyderabad (IN); Stephen William Edge, Escondido, CA (US); Shruti Agrawal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/116,326

(22) Filed: Aug. 29, 2018

(51) Int. Cl.
*H04W 4/029* (2018.01)
*H04L 5/00* (2006.01)
*H04W 64/00* (2009.01)
*H04W 4/20* (2018.01)

(52) U.S. Cl.
CPC ........... *H04W 4/029* (2018.02); *H04L 5/0048* (2013.01); *H04W 4/20* (2013.01); *H04W 64/003* (2013.01)

(58) Field of Classification Search
CPC ..... H04W 4/029; H04W 4/20; H04W 64/003; H04L 5/0048

USPC ...................................................... 455/456.1
See application file for complete search history.

(56) References Cited

U.S. PATENT DOCUMENTS

| | | | |
|---|---|---|---|
| 2018/0113189 A1* | 4/2018 | Khan | G01S 5/0252 |
| 2018/0132061 A1* | 5/2018 | Bitra | H04L 5/0048 |

* cited by examiner

*Primary Examiner* — Chuck Huynh
(74) *Attorney, Agent, or Firm* — Bala Ramasamy; Qualcomm Incorporated

(57) ABSTRACT

Disclosed is a method and apparatus for location determination at a mobile device comprising sending positioning capabilities of the mobile device to a location server, where the positioning capabilities comprise an identification of a partial Radio Frequency (RF) band that is contained within a complete RF band. The positioning capabilities indicate that the mobile device can measure the partial RF band but cannot measure the complete RF band. The mobile device may subsequently receive location assistance data from the location server, where the location assistance data comprises configuration information for at least one reference signal (RS) in the partial RF band. The mobile device may then obtain at least one location measurement from the at least one RS based on the configuration information, and sends location information to the location server, where the location information is based on the at least one location measurement.

30 Claims, 8 Drawing Sheets

METHODS AND SYSTEMS FOR LOCATION DETERMINATION OF A MOBILE DEVICE USING PARTIAL RF BANDS

FIELD

Aspects of the present disclosure relation, in general, to location determination and, more particularly, to location determination using partial radio frequency (RF) bands.

BACKGROUND

Obtaining the location of a mobile device that is accessing a wireless network may be useful for many applications including, for example, emergency calls, personal navigation, asset tracking, locating a friend or family member, etc. Location of a mobile device requires network and/or mobile resources and may require providing assistance data to the mobile device to aid in the determination of a location. However, as mobile devices progress from being mostly smartphones to a plethora of new devices, such as internet of everything (IOT) devices, the devices are becoming more specialized, cheaper and more heterogenous in their RF requirements and needs. For example, a smartphone may be able to support several RF bands but a cheaper IOT device may only be able to communicate or receive data over some RF bands or some portions of those RF bands. As a result, there is a need to improve the capability to support positioning of devices with various limitations in their RF capabilities.

SUMMARY

An example method for location determination at a mobile device comprises sending positioning capabilities of the mobile device to a location server. The positioning capabilities comprising an identification of at least one partial Radio Frequency (RF) band. The partial RF band is contained within a complete RF band and the partial RF band or the complete RF band is transmitted by a plurality of wireless nodes. The positioning capabilities indicate that the mobile device is configured to measure the at least one partial RF band and is not configured to measure the complete RF band. Additionally, the method comprises receiving location assistance data from the location server, wherein the location assistance data comprises configuration information for at least one reference signal (RS) in the at least one partial RF band, wherein the at least one RS is transmitted by at least one wireless node. In addition, the method comprises obtaining at least one location measurement from the at least one RS based on the configuration information, and sending location information to the location server, wherein the location information is based on the at least one location measurement.

An example of a mobile device comprises a memory and one or more transceivers. The one or more transceivers of the mobile device configured to send positioning capabilities of the mobile device to a location server. The positioning capabilities comprising an identification of at least one partial Radio Frequency (RF) band. The partial RF band is contained within a complete RF band and the partial RF band or the complete RF band is transmitted by a plurality of wireless nodes. The positioning capabilities indicate that the mobile device is configured to measure the at least one partial RF band and is not configured to measure the complete RF band. Additionally, the one or more transceivers of the mobile device are configured to receive location assistance data from the location server, wherein the location assistance data comprises configuration information for at least one reference signal (RS) in the at least one partial RF band, wherein the at least one RS is transmitted by at least one wireless node. In addition, the mobile device comprises one or more processors coupled to the memory and the one or more transceivers, and the one or more processors are configured to obtain at least one location measurement from the at least one RS based on the configuration information, and send location information to the location server, wherein the location information is based on the at least one location measurement.

An example of a mobile device for location determination comprises means for sending positioning capabilities of the mobile device to a location server. The positioning capabilities comprising an identification of at least one partial Radio Frequency (RF) band. The partial RF band is contained within a complete RF band and the partial RF band or the complete RF band is transmitted by a plurality of wireless nodes. The positioning capabilities indicate that the mobile device is configured to measure the at least one partial RF band and is not configured to measure the complete RF band. Additionally, the mobile device comprises means for receiving location assistance data from the location server, wherein the location assistance data comprises configuration information for at least one reference signal (RS) in the at least one partial RF band, wherein the at least one RS is transmitted by at least one wireless node. In addition, the mobile device comprises means for obtaining at least one location measurement from the at least one RS based on the configuration information, and means for sending location information to the location server, wherein the location information is based on the at least one location measurement.

An example of a non-transitory computer-readable medium for location determination at a mobile device comprising processor-executable program code configured to cause one or more processors to send positioning capabilities of the mobile device to a location server. The positioning capabilities comprising an identification of at least one partial Radio Frequency (RF) band. The partial RF band is contained within a complete RF band and the partial RF band or the complete RF band is transmitted by a plurality of wireless nodes. The positioning capabilities indicate that the mobile device is configured to measure the at least one partial RF band and is not configured to measure the complete RF band. Additionally, the processor-readable instructions configured to cause one or more processors to receive location assistance data from the location server, wherein the location assistance data comprises configuration information for at least one reference signal (RS) in the at least one partial RF band, wherein the at least one RS is transmitted by at least one wireless node. In addition, the processor-readable instructions configured to cause one or more processors to obtain at least one location measurement from the at least one RS based on the configuration information, and send location information to the location server, wherein the location information is based on the at least one location measurement.

Other and further objects, features, aspects, and advantages of the present disclosure will become better understood with the following detailed description of the accompanying drawings.

Figure 1:
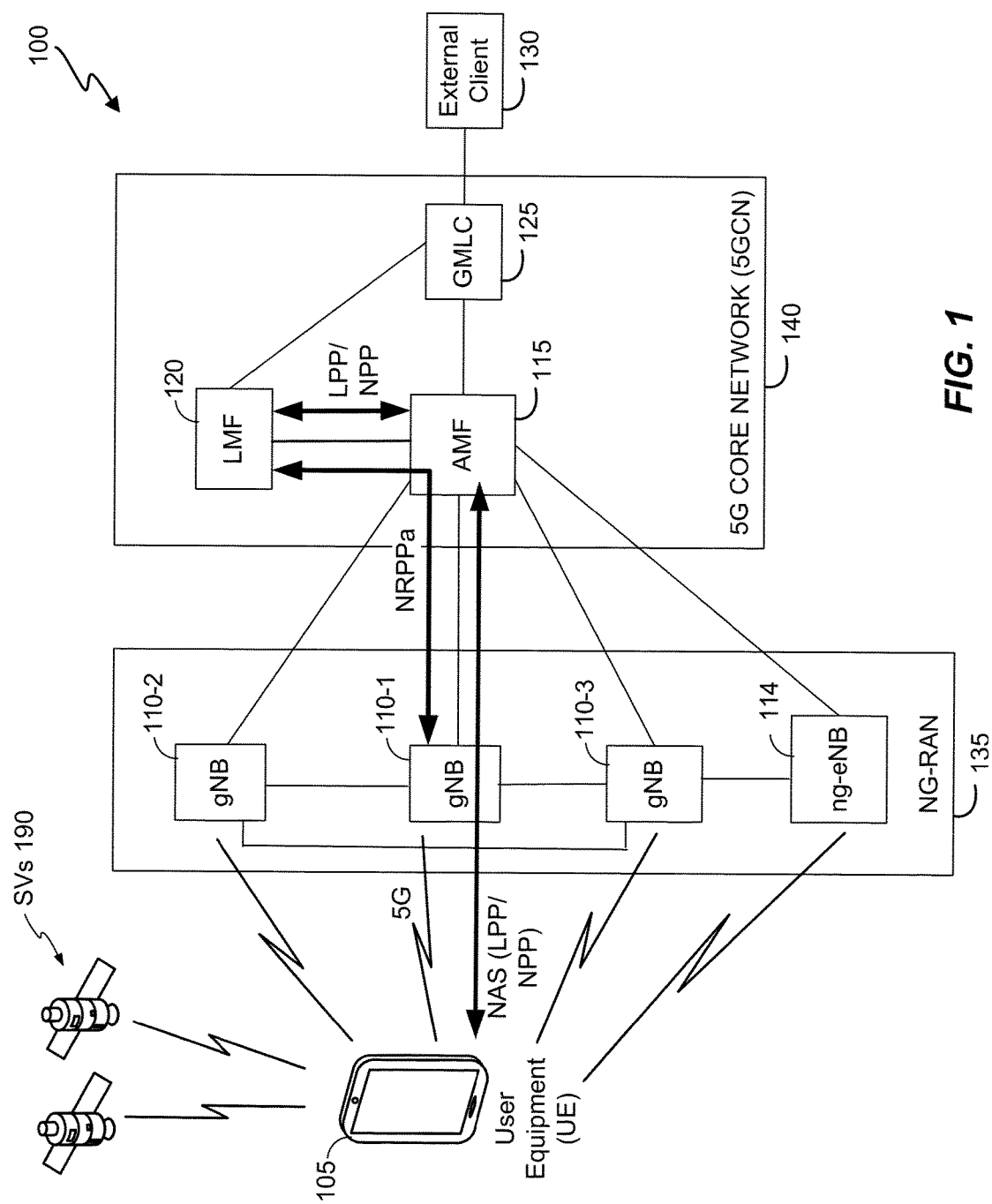
FIG. 1 is a diagram of an example communication system that may utilize a 5G network to determine a position for a mobile device, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c etc. When referring to such an element using only the first number, any instance of the element is to be understood (e.g. element 110 in the previous example would refer to elements 110-1, 110-2 and 110-3 or to elements 110a, 110b and 110c).

DETAILED DESCRIPTION

Obtaining the location of a mobile device that is accessing a wireless network may be useful for many applications including, for example, emergency calls, personal navigation, asset tracking, locating a friend or family member, etc. However, location of a mobile device typically requires usage of resources by a mobile device and/or by a network for such purposes as transmitting uplink (UL) or downlink (DL) signals that can be measured by another device, conveying assistance data to a mobile device that can be used to help obtain measurements and/or help determine a location, and performing processing and communication. The amount of resource usage, particularly on a network side, may increase substantially when many mobile devices need to be located over a period of time—e.g. hundreds, thousands or millions of mobile devices that may need to be located hourly or daily by a large wireless network.

As an example of resource usage by a wireless network, base stations in a wireless network may transmit a positioning reference signal (PRS) continuously or periodically in each cell to support, for example, observed time difference of arrival (OTDOA) location determination (e.g., for LTE or 5G wireless access) which may consume significant operator bandwidth.

As another example of resource usage by a wireless network, location assistance data may be broadcast by a base station in a cell to assist a user equipment (UE) to obtain location related measurements and/or to determine a location from such measurements. In this case, operator bandwidth may be consumed by broadcasting the assistance data but the broadcast may only be received by UEs for some fraction of the broadcast time.

While transmission of a PRS to support location of mobile devices is described herein, transmission of other types of signal such as a Cell-specific Reference Signal (CRS) or Tracking Reference Signal (TRS) may be used instead for some wireless technologies (e.g. such as 5G NR). Consequently, methods exemplified herein to support increased resource allocation for PRS transmission may be equally applicable to transmission of other signals used for positioning such as a CRS or TRS.

As mobile devices progress from being mostly handheld cellphones and smartphones into a plethora of new devices, such as IOT devices, the devices are likely to become more specialized, generally cheaper and more heterogenous in their RF capabilities and needs. For example, a smartphone may be able to support several RF bands, but a cheaper IOT device may only be able to communicate or receive data over some RF bands or some portions of RF bands. As a result, it may not be possible for some UEs to measure signals such as a PRS or CRS over an entire RF band or to make use of assistance data which assists measurements over a whole RF band or assists in determining a location of the UE based on measurements of a whole RF band. This implies the need for solutions to support positioning of a UE that supports only partial RF bands.

FIG. 1 shows a diagram of a communication system 100, according to an embodiment. The communication system 100 may be configured to support positioning of UEs that support partial RF bands. Here, the communication system 100 comprises a UE 105, and components of a Fifth Generation (5G) network comprising a Next Generation (NG) Radio Access Network (RAN) (NG-RAN) 135 and a 5G Core Network (5GCN) 140. A 5G network may also be referred to as a New Radio (NR) network; NG-RAN 135 may be referred to as a 5G RAN or as an NR RAN; and 5GCN 140 may be referred to as an NG Core network (NGCN). Standardization of an NG-RAN and 5GCN is ongoing in the Third Generation Partnership Project (3GPP). Accordingly, NG-RAN 135 and 5GCN 140 may conform to current or future standards for 5G support from 3GPP. The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GCN 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GCN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1, 110-2 and 110-3 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GCN 140 on behalf of the UE 105 using 5G NR. 5G NR radio access may also be referred to as NR radio access or as 5G radio access. In FIG. 1, the primary serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114.

As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a Fourth Generation (4G) Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GCN 140 in FIG. 1. The methods and techniques described herein for support of positioning of a UE 105 that supports partial RF bands may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), and/or other position methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GCN 140 in some implementations.

As further illustrated in FIG. 1, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a transport protocol or a Hypertext Transfer Protocol (HTTP) based service operation, and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

With a UE assisted position method, UE 105 may obtain location measurements (e.g. of signals transmitted by gNBs 110, ng-eNB 114 and/or SVs 190) and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 105, and/or may receive measurements obtained by UE 105, and may send the measurements to a location server (e.g. LMF 120) for computation of a location estimate for UE 105.

Information provided by the gNBs 110 and/or ng-eNB 114 to the LMF 120 using NRPPa may include timing and configuration information for PRS transmission and location coordinates. The LMF 120 can then provide some or all of this information to the UE 105 as assistance data in an LPP and/or NPP message via the NG-RAN 135 and the 5GCN 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 105 of a signal (e.g. a PRS signal) transmitted or broadcast by one gNB 110 and a similar signal transmitted by another gNB 110. The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 140 may be configured to control different air interfaces. For example, in some embodiments, 5GCN 140 may be connected to a WLAN, either directly or using a Non-3GPP InterWorking Function (N3IWF, not shown FIG. 1) in the 5GCN 140. For example, the WLAN may support IEEE 802.11 WiFi access for UE 105 and may comprise one or more WiFi APs. Here, the N3IWF may connect to the WLAN and to other elements in the 5GCN 140 such as AMF 115. In some other embodiments, both the NG-RAN 135 and the 5GCN 140 may be replaced by other RANs and other core networks. For example, in an EPS, the NG-RAN 135 may be replaced by an E-UTRAN containing eNBs and the 5GCN 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, support for positioning of a UE 105 that supports partial RF bands may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

To support certain position methods such as OTDOA and transmission of PRS or other signals used in positioning of a UE 105, base stations may be synchronized. In a synchronized network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same time as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNBs 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol.

To support positioning methods such as OTDOA in which a UE 105 measures PRS, CRS, TRS or other signals transmitted by gNBs 110 and/or ng-eNB 114, the UE 105 can indicate the RF bands supported by the UE 105 to LMF 120. LMF 120 can then request measurements from UE 105 (e.g. RSTD measurements) for signals in one or more of the supported RF bands and possibly provide assistance data to UE 105 to help enable these measurements. For example, the assistance data could indicate the carrier frequency, bandwidth, PRS positioning occasions, PRS code sequence, PRS muting pattern and other configuration parameters for a PRS signal for which measurements are requested as described in more detail later with reference to FIGS. 3 and 4. However, one important consideration which may not be supported is that UE 105 may not support an entire frequency band for a PRS (or other signal) and instead only support a partial band due to various limitations such as RF front-end limitations, cost constraints, filter limitations across an entire frequency band etc. This limitation may be particularly likely for RF bands at higher frequencies which may have a wide bandwidth. Examples of such RF bands may include 5G bands for 27.5-28.35 GHz and 37-40 GHz in the US, 26.5-29.5 GHz in Korea, 27.5-28.28 GHz in Japan, 24.25-27.5 GHz and 37-43.5 GHz in China, 26.5-27.5 GHz in Sweden and 24.25-27.5 GHz in the European Union, which may be allocated for 5G trials and evaluation and later for commercial operation. For these RF bands (and/or others), UE 105 may only support a portion of the overall frequency range—e.g. may support 200 MHz of frequency at the top, bottom or somewhere in the middle of the frequency range.

In the absence of an ability to indicate partial band support, a UE 105 may determine not to indicate support for an RF band to LMF 120 which may cause LMF 120 to not request measurements for this RF band which may reduce location accuracy or prevent location of UE 105. Alternatively, when UE 105 only partially supports an RF band, UE 105 may indicate to LMF 120 that the entire band is supported, which may result in a request for measurements by LMF 120 which UE 105 is unable to perform or can only perform with impaired accuracy and reliability, which may again reduce location accuracy or prevent location of UE 105.

To overcome such limitations, UE 105 may indicate to LMF 120 if UE 105 supports only part of an RF band and may include information concerning which part(s) of the RF band are supported. As an example, this information could be included as part of UE 105 positioning capabilities transferred to LMF 120 using LPP or NPP.

Partial support for an RF band can be indicated by UE 105 in different ways. In one embodiment, UE 105 can indicate the supported resource blocks (RBs) (or subcarriers) within the RF band. For example, UE 105 may provide a set of integers I1, I2, I3 . . . to LMF 120, where I1 indicates a number of consecutive supported RBs starting from the lowest frequency for the RF band, I2 indicates a number of consecutive non-supported RBs immediately following the supported RBs indicated by I1, I3 indicates a number of consecutive supported RBs immediately following the non-supported RBs indicated by I2 etc.

In another embodiment, UE 105 can indicate partial support for an RF band by indicating frequency regions within the RF band which are supported. For example, UE 105 may indicate one or more supported frequency regions by providing a frequency range for each supported region (e.g. 50 MHz, 100 MHz, etc.) and may indicate where each supported frequency range occurs in the RF band by indicating whether it is at the top end, bottom end or somewhere in the middle of the band (and may then also provide an offset to the supported frequency range relative to the top or bottom of the range).

Other embodiments can include UE 105 providing a bit map to LMF 120, where a bit map refers to a particular set of consecutive RBs (or sub carriers) and indicates whether each RB or subcarrier is supported (e.g. via a bit with a one value) or not supported (e.g. via a bit with a zero value). In another embodiment, UE 105 may provide a set of integers or enumerated values to LMF 120 to indicate particular sets of RBs (or subcarriers) which are or are not supported.

Based on the indication(s) of partial RF band support received from UE 105, LMF 120 can request measurements from UE 105 (e.g. RSRD measurements) and/or provide assistance data to UE 105 only for PRS, CRS, TRS or other signals which are entirely contained within (or otherwise entirely supported by) the portions of any RF band that are indicated as supported by UE 105.

Figure 2:
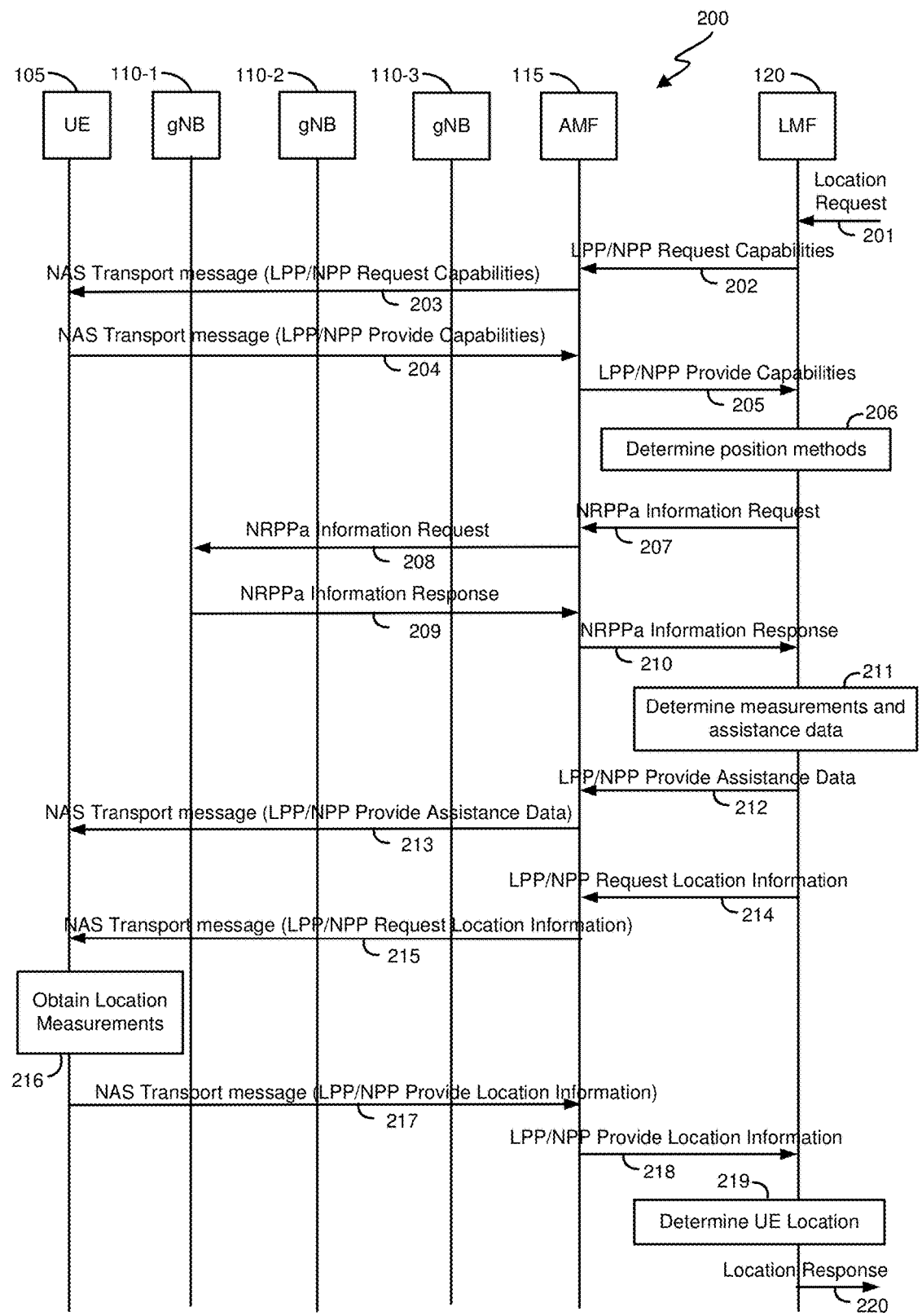
FIG. 2 is a signaling flow diagram showing messages sent between components of a communication network during a location session in accordance with the techniques and methods described herein.

FIG. 2 shows a signaling flow 200 that illustrates various messages sent between components of the communication system 100 depicted in FIG. 1, during a location session between the UE 105 and the LMF 120. While the flow diagram 200 is discussed, for ease of illustration, in relation to a 5G NR wireless access using gNBs 110, signaling flows similar to FIG. 2 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 200, it is assumed that the UE 105 and LMF 120 communicate using the LPP and/or NPP positioning protocols referred to earlier. Thus, messages for signaling flow 200 are referred to as LPP/NPP messages which may comprise LPP messages (without use of NPP), NPP messages (without use of LPP) or LPP messages combined with NPP messages (e.g. wherein an NPP message is encapsulated within an LPP message). However, messages for other positioning protocols may also be used in other signaling flows similar to signaling flow 200.

In some embodiments, a location session for UE 105 can be triggered when the LMF 120 receives a location request at action 201. Depending on the scenario, the location request may come to the LMF 120 from the AMF 115, from the GMLC 125 or from the UE 105 (e.g. via the serving gNB 110-1 and the AMF 115) depicted in FIG. 1. In some implementations, the LMF 120 may then query the AMF 115 for information for the UE 105 and the AMF 115 may then send information for the UE 105 to the LMF 120 (not shown in FIG. 2). The information may indicate that the UE has 5G NR wireless access (for the example embodiments of FIG. 2), and may provide the identity (ID) of a current NR serving cell for the UE 105 (e.g. a cell supported by gNB 110-1 which may be a serving gNB for the UE 105) and/or may indicate that the UE 105 supports location using LPP/NPP. Some or all of this information may have been obtained by the AMF 115 from the UE 105 and/or from the gNB 110-1, e.g., when the UE 105 obtains a signaling link to the AMF 115 and/or registers with the AMF 115. In some other implementations, the same or similar information may be included in a location request sent by AMF 115 to LMF 120 at action 201.

To begin the location session (e.g., and based on an indication of UE support for LPP/NPP with 5G NR wireless access), the LMF 120 sends an LPP/NPP Request Capabilities message at action 202 to the AMF 115 serving the UE 105 (e.g. using a transport protocol or HTTP based service operation). The AMF 115 may include the LPP/NPP Request Capabilities message within a 5G NAS transport message, at action 203, which is sent to the UE 105 (e.g., via the serving gNB 110-1, as illustrated in FIG. 1). The UE 105 responds to the AMF 115 with an LPP/NPP Provide Capabilities message at action 204, also sent within a 5G NAS transport message. The AMF 115 extracts the LPP/NPP Provide Capabilities message from the 5G NAS transport message and relays the LPP/NPP Provide Capabilities message to the LMF 120 (e.g., using a transport protocol or HTTP based service operation) at action 205. Here, the LPP/NPP Provide Capabilities message sent at actions 204 and 205 may indicate the positioning capabilities of the UE 105 with respect to LPP/NPP, e.g., the LPP and/or NPP position methods and associated LPP and/or NPP assistance data supported by the UE 105 (e.g. such as A-GNSS positioning, OTDOA positioning, ECID positioning, WLAN positioning, etc.) while accessing a 5G NR network.

The positioning capabilities provided at actions 204 and 205 by UE 105 may indicate positioning capabilities of UE 105 with respect to RF band support as described previously. For example, the positioning capabilities may include an identification of at least one partial RF band, where the partial RF band is contained within a complete RF band. The identification of at least one partial RF band may indicate that the UE 105 is configured to measure the at least one partial RF band and is not configured to measure the complete RF band. In another example, if the complete RF band is listed, without excluding any frequencies, frequency ranges, resource blocks, reference signals, etc., then this may indicate to LMF 120 that UE 105 is configured to measure the complete RF band. These positioning capabilities may help the LMF 120 determine a suitable position method or position methods, suitable signal measurements to request and/or suitable assistance data for the UE 105.

The identification of at least one partial RF band at actions 204 and 205 by UE 105 may comprise an identification of at least one resource block (RB), an identification of at least one subcarrier (SC), an identification of at least one frequency range, an identification of a minimum frequency, an identification of a maximum frequency, an identification of an offset from a minimum frequency, an identification of an offset from a maximum frequency, or any combination thereof. In an example for LTE Band 41 which may span the frequency range 2496 MHz-2690 MHz, the UE 105 may indicate in the positioning capabilities sent at actions 204 and 205 that the UE is configured to measure a subrange of 2496 MHz through 2516 MHz. As a result, the UE 105 indicates that it is configured to measure this subrange and it is not configured to measure the entirety of LTE band 41.

In another example, the UE 105 may indicate support for at least one partial RF band at actions 204 and 205 by indicating support for a frequency range and an offset from a minimum frequency, such as by indicating support for a one hundred MHz frequency range for LTE Band 41 offset by 20 MHz from the minimum frequency 2496 MHz. In this example, UE 105 may indicate the RF band (LTE Band 41), the supported frequency range (one hundred MHz), the offset (20 MHz) and the minimum frequency (e.g. which may be referred to using a flag or may be assumed by the LMF 120 by default).

According to an aspect of the disclosure, the UE 105 may indicate at least one partial RF band at actions 204 and 205 by indicating an RF band and an offset, where the offset applies to a minimum or maximum frequency for the RF band (e.g. where the indication of a minimum or maximum frequency may be pre-configured, standardized or may be provided explicitly using a flag or other parameter). In this aspect, there may be a convention that UE 105 is able to (i) support all frequencies between the minimum frequency for the RF band and the minimum frequency plus the offset in the case that a minimum frequency is indicated, or (ii) is able to support all frequencies starting from the maximum frequency minus the offset to the maximum frequency in the case that a maximum frequency is indicated. For example, UE 105 may indicate LTE band 41, an offset of twenty MHz, and a maximum frequency for LTE band 41. As a result, LMF 102 may infer that UE 105 is configured to measure a frequency range of 2670 MHz to 2690 MHz.

In another aspect, UE 105 may indicate at least one partial RF band at actions 204 and 205 by indicating a starting frequency and an ending frequency. For example, the UE 105 may indicate a starting frequency of 2659 MHz and an ending frequency of 2679 MHz for LTE Band 41, which may indicate that UE 105 is not configured to measure the entirety of LTE band 41 but is only configured to measure the frequency range 2659 to 2679 MHz.

According to another aspect of the disclosure, UE 105 may provide a plurality of partial RF bands at actions 204 and 205, where the plurality of partial RF bands have non-overlapping RF frequencies. For example, the UE may specify, through one of the many ways described throughout this specification, that UE 105 is configured to measure the frequency ranges 2496 MHz to 2596 MHz, 2610 MHz to 2630 MHz and 2650 MHz to 2670 MHz. This may indicate to LMF 120 that UE 105 cannot measure LTE band 41 in its entirety but can measure the three RF frequency ranges within LTE band 41 which are indicated.

In another aspect, the at least one partial RF band indicated by UE 105 at actions 204 and 205 may comprise a plurality of one or more resource blocks (RBs), a plurality of one or more subcarriers (SCs), a plurality of one or more frequency ranges or any combination thereof. An RB may comprise a number of consecutive subcarriers (e.g. for 5G NR or LTE) as described in more detail in association with FIGS. 3 and 4.

The identification of the at least one partial RF band provided by UE 105 at actions 204 and 205 may comprise a bit string, a set of integers, a set of identifiers or any combination thereof. In one implementation, the UE 105 may specify frequencies or frequency ranges, that comprise the at least one partial RF band that is supported within a complete RF band, via a bit string, where the bit string may have a bit for each frequency within the frequency band. For example, in LTE band 38, which spans the frequency range 2570 MHz to 2620 MHz with a bandwidth of 50 MHz, if the first 10 MHz comprise the partial band supported by UE 105 then UE may provide a bit string containing 50 bits with the first 10 bits each set to one to indicate support of the first 10 MHz and the remaining 40 bits each set to zero to indicate no support for the remaining 40 MHz.

In another aspect, the at least one partial RF band may be indicated by UE 105 at stages 204 and 205 by providing an integer or set of integers. For example, integers at odd positions within a set of integers (e.g. the first, third, fifth integers etc.) may indicate numbers of consecutive RBs which are supported by UE 105, while integers at even positions within the set of integers (e.g. the second, fourth integers etc.) may indicate numbers of consecutive RBs which are not supported by UE 105. Thus, for an RF band that comprises 10 consecutive RBs, UE 105 may provide a set of integers comprising (2, 1, 3, 4), to indicate support for the first 2 consecutive RBs in the RF band, non-support for the next RB, support for the next 3 RBs and non-support for the next and final 4 RBs. In a variant of this aspect, the indication of support and non-support may be reversed such that a first integer in a set of integers indicates a number of non-supported RBs starting from a first RB for an RF band. UE 105 support and non-support for SCs and/or frequency ranges may be indicated in a similar manner using a set of integers.

Based on the positioning capabilities received by LMF 120 from UE 105 at action 205, LMF 120 may determine at block 206 one or more position methods to be used for location of UE 105. For example, LMF 120 may determine position methods at block 206 that do not depend on the partial RF bands supported by UE 105 or that can be supported reliably and accurately by UE 105 using the partial RF bands supported by UE 105 and may not determine position methods at block 206 that require support of one or more RF bands by UE 105 but cannot be supported reliably and accurately using the partial RF bands supported by UE 105.

The LMF 120 may then send an NRPPa Information Request message at action 207 to AMF 115, which may be relayed to the serving node gNB 110-1 by the AMF 115 at action 208. The NRPPa Information Request may request location-related information for the gNB 110-1 to enable support of one or more of the position methods determined at block 206. For example, in the case of the OTDOA position method, the requested location information may include the location of the gNB 110-1 and PRS configuration parameters for gNB 110-1. The serving gNB 110-1 responds with an NRPPa Information Response message, at action 209, which may be relayed to the LMF 120 via the AMF 115 at action 210. The NRPPa Information Response may provide some or all of the requested location-related information such as the PRS configuration parameters for the gNB 110-1. Actions 207-210 may be repeated by the LMF 120 to obtain similar location information (e.g. PRS configuration parameters) from other gNB 110s nearby to UE 105, such as gNBs 110-2 and 110-3 (not shown in FIG. 2).

Based on the positioning capabilities received by LMF 120 from UE 105 at action 205 and/or the location related information obtained for gNBs 110 at actions 207-210, LMF 120 may determine at block 211 one or more location measurements or types of location measurements for one or more of the position methods determined at block 206, and/or may determine assistance data to be sent to UE 105 to assist the determined position methods, the determined location measurements and/or determination of a location estimate for UE 105 by UE 105. As part of the determination at block 211, LMF 105 may make use of any indication of partial RB band support provided by UE 105 at actions 204 and 205, as described previously. For example, LMF 120 may determine location measurements at block 211 that can be supported by UE 105 using the partial RF bands supported by UE 105 and may not determine location measurements at block 206 that cannot be supported by UE 105 using the partial RF bands supported by UE 105. Similarly, LMF 120 may determine assistance data at block 211 that may include location related information received at action 210 and/or that may assist UE 105 to obtain the location measurements determined at block 211 given the indicated support of UE 105 for partial RF bands.

As one example of the determination at block 211, LMF 120 may determine to request an OTDOA RSTD measurement from UE 105 for a neighbor cell supported by gNB 110-2, where the neighbor cell supports multiple PRS configurations, which have different bandwidth, different frequencies (e.g. use different RBs) and may in some cases use frequency hopping. LMF 120 may then only include assistance data for those PRS configurations whose bandwidth, frequencies and any frequency hopping use one or more of the partial RF bands supported by UE 105 and do not use RF bands and portions of RF bands that are not supported by UE 105. In an aspect, where a PRS configuration for the neighbor cell uses frequency hopping over an entire RF band and where UE 105 supports only a portion of the entire RF band, LMF 120 may (i) determine assistance data that identifies PRS positioning occasions for the PRS configuration whose bandwidth is entirely contained within the portion of the RF band supported by UE 105, and may (ii) omit assistance data that identifies PRS positioning occasions for the PRS configuration whose bandwidth lies partially or completely outside the portion of the RF band supported by UE 105. This aspect may enable UE 105 to measure all of the PRS positioning occasions for the PRS configuration for the neighbor cell that are included by LMF 120 in the assistance data. In one example, PRS positioning occasions for the PRS configuration for the neighbor cell may have a periodicity of 160 ms and may use frequency hopping in a cyclic manner over four separate frequency ranges with only one of the frequency ranges being entirely contained within the portion of the RF band supported by UE 105. In this example, LMF 120 can indicate to UE 105 that the periodicity of this PRS configuration is 640 ms (i.e. four times 160 ms) rather than 160 ms in order for UE 105 to only measure every fourth PRS positioning occasion, which LMF 120 can align with the particular positioning occasions which use the frequency range supported by UE 105 (e.g. via other PRS configuration parameters such as a starting subframe number).

In one implementation, LMF 120 determines assistance data at block 211 based on the at least one partial RF band indicated in the positioning capabilities received at action 205. For example, if the at least one partial RF band is specified as 2500 MHz to 2600 MHz, then the assistance data may be limited to this partial RF band (e.g. may include configuration parameters for PRS signals that are transmitted by one or more gNBs 110 within this partial RF band) and may not include assistance data for the associated complete RF band (e.g. LTE band 41) (e.g. may not include configuration parameters for PRS signals which are transmitted by one or more gNBs 110 using the entire RF band). The assistance data determined at block 211 may include location related information received by LMF 120 at actions 207-210 and/or other assistance data already known to the LMF 120 or obtained from other sources (e.g. such as a GNSS or RTK reference station or reference network), The LMF 120 then sends the assistance data determined at block 211 to UE 105. The assistance data is sent in an LPP/NPP Provide Assistance Data message sent to the AMF 115 at action 212, and relayed to the UE 105 in a 5G NAS transport message at action 213. In the case of OTDOA positioning, the assistance data can include the identities of a reference cell and neighbor cells supported by gNBs 110 and may include information for each cell, such as the cell carrier frequency, and Reference Signal (RS) or PRS configuration parameters for the cell (e.g. including PRS bandwidth, periodicity and duration of PRS positioning occasions, PRS code sequence, PRS muting etc.).

In one implementation, LMF 120 may indicate which portions of assistance data sent at actions 212 and 213 are relevant to the UE 105 based on the at least one partial RF band in the positioning capabilities received at action 205. For example, complete assistance data may be sent by LMF 120 at actions 212 and 213 for the positioning method(s) determined at block 206 for various complete RF bands that may be transmitted (e.g. as PRS signals) by one or more wireless nodes (e.g. gNBs 110, ng-eNB 114, etc.). In this case, the LMF 120 may also indicate to the UE 105 in the LPP/NPP Provide Assistance Data message sent at actions 212 and 213 which portions of the assistance may be relevant to the UE 105, given the UE 105 support for the at least one partial RF band.

The LPP/NPP Provide Assistance Data message sent at actions 212 and 213 can be followed by an LPP/NPP Request Location Information message, again sent from the LMF 120 to the AMF 115, at action 214, which is relayed to the UE 105 in a 5G NAS transport message by the AMF 115 at action 215. The LPP/NPP Request Location Information message may request one or more location measurements from the UE 105 as determined at block 211 and/or a location estimate. The location measurements may for example include Reference Signal Time Difference (RSTD) measurements for OTDOA and/or pseudorange (or code phase) measurements for A-GNSS.

At block 216 the UE 105 can subsequently obtain some or all of the location measurements (and other information such as a location estimate) requested at actions 214 and 215. The location measurements may be obtained based, at least in part, on PRS signals transmitted by the various cells detected by the UE 105. The location measurements may be obtained by UE 105 using one or more partial RF bands supported by UE 105 which may be assisted by the assistance data received at action 213. In one implementation, the UE 105 may obtain some or all of the location measurements independent of a request from the LMF (e.g. with actions 214 and 215 not occurring). For example, the UE 105 may perform UE-based OTDOA without network involvement if it has assistance data to perform the measurement.

In some embodiments, at least some of the location measurements, and/or other location information (e.g. a location estimate), obtained by the UE 105 at block 216 are provided in an LPP/NPP Provide Location Information message, which is sent from the UE 105 to the AMF 115 in a 5G NAS transport message at action 217. The AMF 115 extracts the LPP/NPP Provide Location Information message from the 5G NAS transport message, and relays it to the LMF 120 at action 218. With this information, the LMF 120 may determine the UE location (or determine a location approximation), at block 219, and provide a location response containing the determined location to the requesting entity at action 220. As noted, in some embodiments, at least some of the location determination operations may be performed at the UE 105.

In FIG. 2, the LMF 120 may request the UE 105 to obtain OTDOA RSTD measurements at actions 214 and 215, and the OTDOA RSTD measurements obtained at block 216 may be obtained by UE 105 by measuring PRS signals transmitted from gNBs 110 (e.g. gNBs 110-1, 110-2 and 110-3). The OTDOA RSTD measurements may be obtained by UE 105 at block 216 only for PRS and other RS signals that are contained within the partial RF bands supported by UE 105, due to LMF 120 ensuring at block 211 that the requested location measurements can be supported by these partial RF bands.

Figure 3:
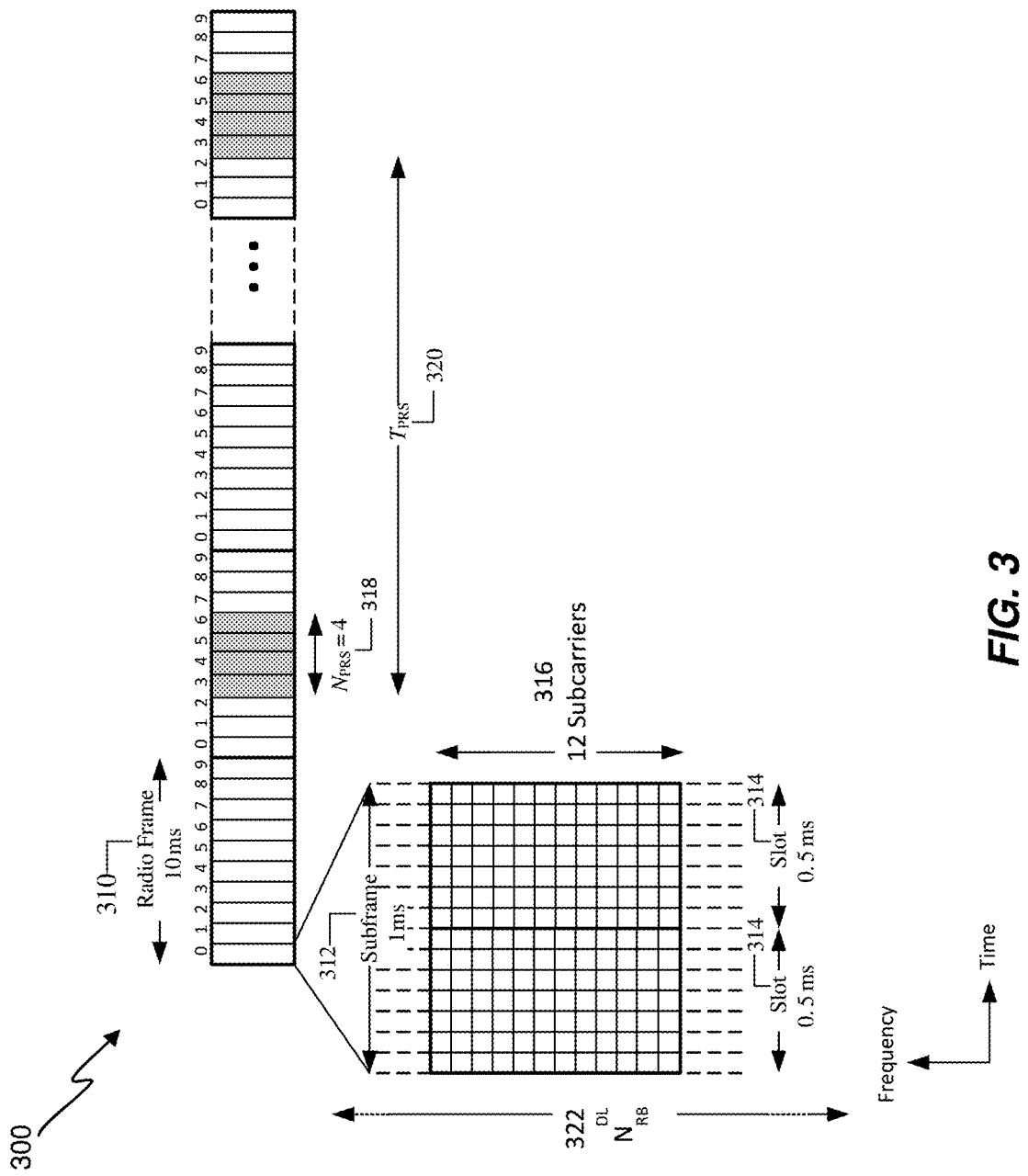
FIG. 3 is a diagram of a structure of an example LTE subframe sequence with PRS positioning occasions.

FIG. 3 shows a structure of an example LTE subframe sequence 300 with PRS positioning occasions. While FIG. 3 provides an example of a subframe sequence for LTE in association with an EPS, similar or identical subframe sequence implementations may be realized for other communication technologies/protocols, such as 5G NR. For example, support of PRS transmission by a gNB 110 or ng-eNB 114 in communication system 100 may be similar or identical to that described for LTE in an EPS with reference to FIGS. 3 and 4. In FIG. 3, time is represented horizontally (e.g., on an X axis) with time increasing from left to right, while frequency is represented vertically (e.g., on a Y axis) with frequency increasing (or decreasing) from bottom to top. As shown in FIG. 3, downlink and uplink LTE Radio Frames 310 may be of 10 milliseconds (ms) duration each. For downlink Frequency Division Duplexing (FDD) mode, Radio Frames 310 are organized, in the illustrated embodiments, into ten subframes 312 of 1 ms duration each. Each subframe 312 comprises two slots 314, each of, for example, 0.5 ms duration.

In the frequency domain, the available bandwidth may be divided into uniformly spaced orthogonal subcarriers 316. For example, for a normal length cyclic prefix using, for example, 15 kHz spacing, subcarriers 316 may be grouped into a group of twelve (12) subcarriers. Each grouping, which comprises the 12 subcarriers 316, is termed a resource block (RB) and, in the example above, the number of subcarriers in the resource block may be written as $N_{SC}^{RB}=12$. For a given channel bandwidth, the number of available resource blocks on each channel 322, which is also called the transmission bandwidth configuration 322, is indicated as $N_{RB}^{DL}$. For example, for a 3 MHz channel bandwidth in the above example, the number of available resource blocks on each channel 322 is given by $N_{RB}^{DL}=15$.

In the communication system 100 illustrated in FIG. 1, a gNB 110, such as any of the gNBs 110-1, 110-2, or 110-3, or an ng-eNB 114 may transmit frames, or other physical layer signaling sequences, supporting PRS signals (i.e. a downlink (DL) PRS) according to frame configurations similar or identical to that shown in FIG. 3 and (as described later) in FIG. 4, which may be measured and used for UE (e.g., UE 105) position determination. As noted, other types of wireless nodes and base stations may also be configured to transmit PRS signals configured in a manner similar to that depicted in FIGS. 3 and 4. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes (e.g. eNBs) after appropriate configuration (e.g., by an Operations and Maintenance (O&M) server). A PRS may be transmitted in special positioning subframes (also referred to as PRS subframes) that are grouped into positioning occasions (also referred to as PRS positioning occasions). For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 3 illustrates a periodicity of positioning occasions where $N_{PRS}$ 318 equals 4 and $T_{PRS}$ 320 is greater than or equal to 20. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and RSTD measurement, by UEs (such as the UE 105 depicted in FIG. 1), of PRS signals that are not muted (by avoiding interference from PRS signals that have been muted). Muting may be viewed as the non-transmission of a PRS for a given positioning occasion for a particular cell. Muting patterns may be signaled (e.g. using LPP or NPP) to a UE 105 using bit strings. For example, in a bit string signaling a muting pattern, if a bit at position j is set to '0', then the UE 105 may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID (denoted as $N_{ID}^{PRS}$) for a cell or Transmission Point (TP) or as a function of a Physical Cell Identifier (PCI) (denoted as $N_{ID}^{cell}$) if no PRS ID is assigned, which results in an effective frequency re-use factor of 6, as described in 3GPP TS 36.211.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration comprises a distinct sequence of PRS positioning occasions with a particular number of subframes ($N_{PRS}$) per positioning occasion and a particular periodicity ($T_{PRS}$). Further enhancements of a PRS may also be supported by a wireless node.

As discussed herein, in some embodiments, OTDOA assistance data may be provided to a UE 105 by a location server (e.g., the LMF 120 of FIG. 1, an E-SMLC, etc.) for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting pattern, frequency hopping sequence, code sequence, PRS ID, PRS bandwidth), a cell global ID, and/or other cell related parameters applicable to OTDOA or some other positioning procedure.

PRS-based positioning by a UE 105 may be facilitated by indicating the serving cell for the UE 105 in the OTDOA assistance data (e.g. with the reference cell indicated as being the serving cell). In the case of a UE 105 with 5G NR wireless access, the reference cell may be chosen by the LMF 120 as some LTE cell with good coverage at the expected approximate location of the UE 105 (e.g., as indicated by the known 5G NR serving cell for the UE 105).

In some embodiments, OTDOA assistance data may also include "expected RSTD" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, define a search window for the UE 105 within which the UE 105 is expected to measure the RSTD value. OTDOA assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD.

Using the RSTD measurements, the known absolute or relative transmission timing of each cell, and the known position(s) of wireless node physical transmitting antennas for the reference and neighboring cells, the UE 105's position may be calculated (e.g., by the UE 105, by the LMF 120, or by some other node). More particularly, the RSTD for a cell "k" relative to a reference cell "Ref", may be given as ($TOA_k$−$TOA_{Ref}$). TOA measurements for different cells may then be converted to RSTD measurements (e.g. as defined in 3GPP TS 36.214 entitled "Physical layer; Measurements") and sent to the location server (e.g., the LMF 120 or an E-SMLC) by the UE 105. Using (i) the RSTD measurements, (ii) the known absolute or relative transmission timing of each cell, and (iii) the known position(s) of physical transmitting antennas for the reference and neighboring cells, the UE 105's position may be determined.

Figure 4:
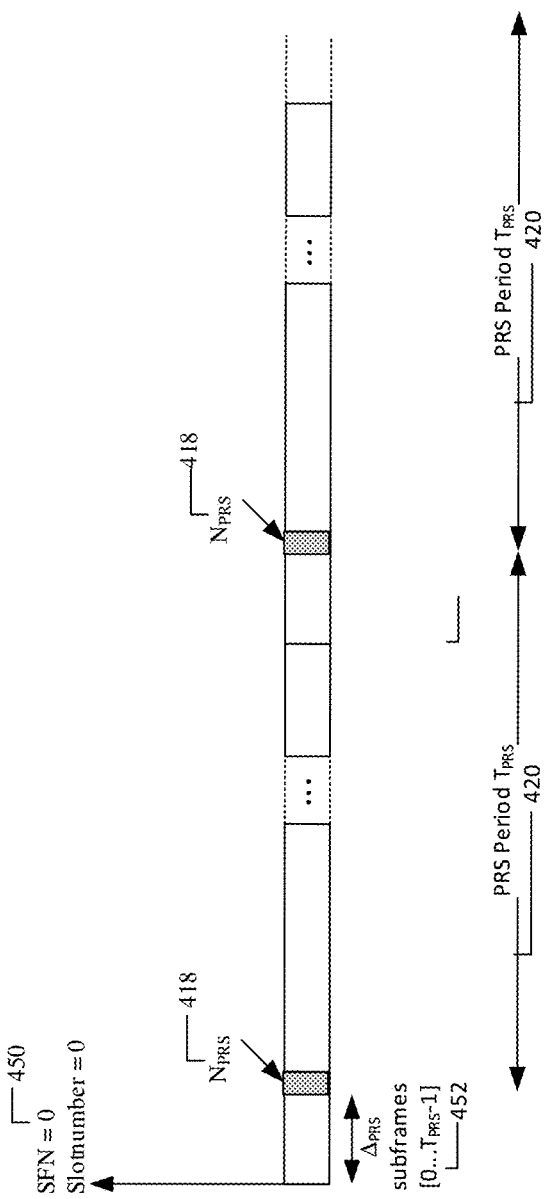
FIG. 4 is a diagram illustrating further aspects of PRS transmission for a cell supported by a wireless node.

FIG. 4 illustrates further aspects of PRS transmission for a cell supported by a wireless node (such as an eNB, gNB 110 or ng-eNB 114). Again, PRS transmission for LTE in an EPS is assumed in FIG. 4 although the same or similar aspects of PRS transmission to those shown in and described for FIG. 4 may apply to 5G NR support by a gNB 110, LTE support by an ng-eNB 114 and/or other wireless technologies. FIG. 4 shows how PRS positioning occasions are determined by a System Frame Number (SFN), a cell specific subframe offset ($\Delta_{PRS}$) and the PRS Periodicity ($T_{PRS}$) 420. Typically, the cell specific PRS subframe configuration is defined by a "PRS Configuration Index" $I_{PRS}$ included in the OTDOA assistance data. The PRS Periodicity ($T_{PRS}$) 420 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \qquad (1)$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity, and $\Delta_{PRS}$ is the cell-specific subframe offset.

As shown in FIG. 4, the cell specific subframe offset $\Delta_{PRS}$ 452 may be defined in terms of the number of subframes Transmitted starting from System Frame Number 0 (Slot 'Number 0', marked as slot 450) to the start of the first (subsequent) PRS positioning occasion. In FIG. 4, the number of consecutive positioning subframes 418 ($N_{PRS}$) equals 4.

In some embodiments, when a UE 105 receives a PRS configuration index $I_{PRS}$ in the OTDOA assistance data for a particular cell, the UE 105 may determine the PRS periodicity $T_{PRS}$ and PRS subframe offset $\Delta_{PRS}$ using Table 1. The UE 105 may then determine the radio frame, subframe and slot when a PRS is scheduled in the cell (e.g., using equation (1)). The OTDOA assistance data may be determined by, for example, the LMF 120 or an E-SMLC and includes assistance data for a reference cell, and a number of neighbor cells supported by various wireless nodes (e.g. eNBs, gNBs 110 or ng-eNBs 114).

Typically, PRS occasions from all cells in a network that use the same frequency are aligned in time and may have a fixed known time offset relative to other cells in the network that use a different frequency. In SFN-synchronous networks all wireless nodes (gNBs 110, ng-eNBs 114, eNBs, etc.) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 105 may determine the timing of the PRS occasions (e.g., in an LTE network or a 5G NR network such as that in communication system 100) of the reference and neighbor cells for OTDOA positioning, if the UE 105 can obtain the cell timing (e.g., SFN or Frame Number) of at least one of the cells, e.g., the reference cell or a serving cell (which may be performed at block 216 of FIG. 2). The timing of the other cells may then be derived by the UE 105 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, including: (i) a reserved block of bandwidth (BW); (ii) the configuration index $I_{PRS}$; (iii) the duration $N_{PRS}$; (iv) an optional muting pattern; and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355.

Figure 5:
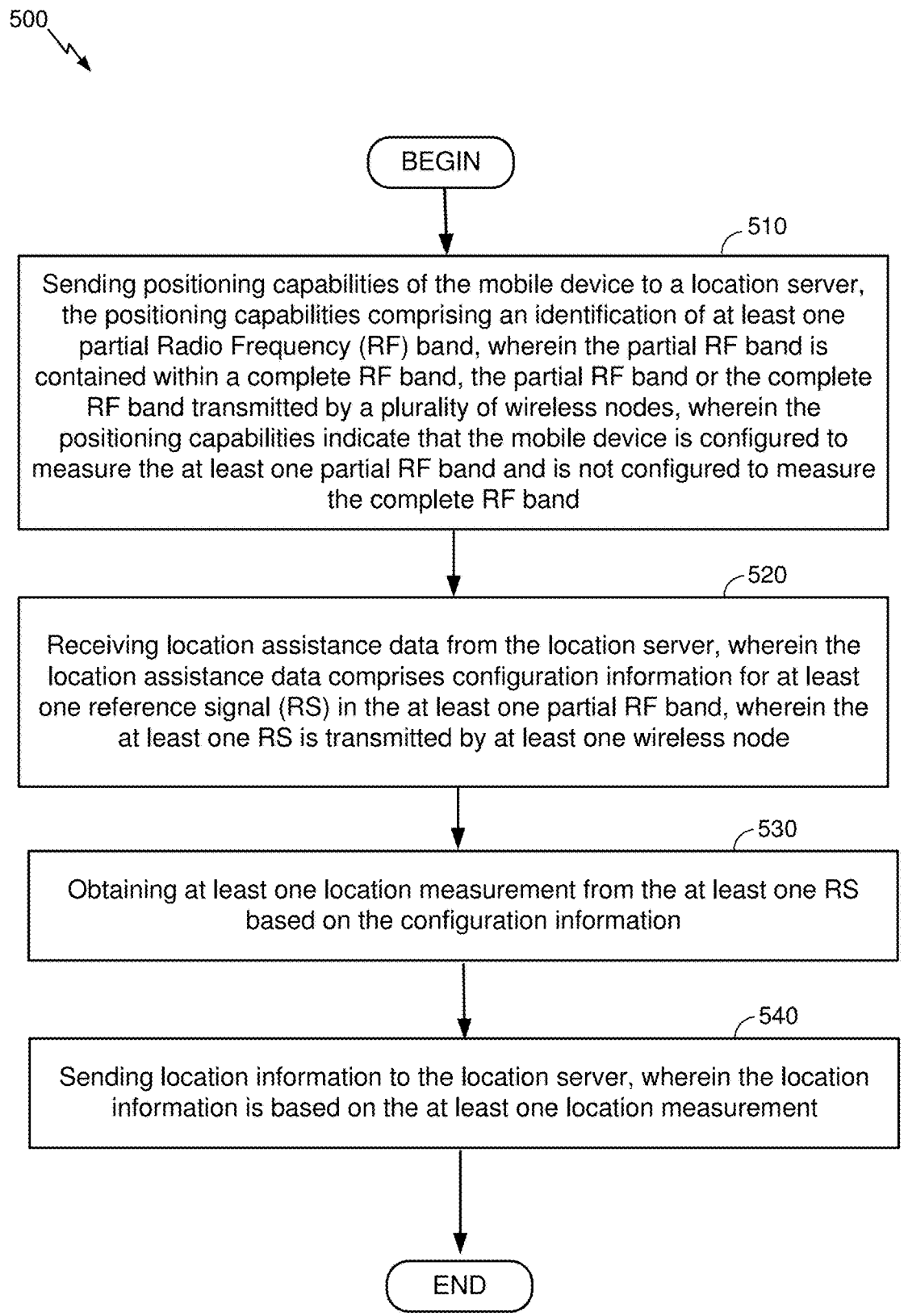
FIG. 5 is a flowchart of an example process, generally performed at a mobile device, to support location of the mobile device in accordance with the techniques and methods described herein.

FIG. 5 shows a flowchart of an example process 500 for locating a mobile device, generally performed at the mobile device such as the UE 105.

At block 510, the process 500 includes sending positioning capabilities of the mobile device to a location server (e.g. LMF 120, an E-SMLC or a SUPL Location Platform (SLP)), where the positioning capabilities comprise an identification of at least one partial RF band, where the partial RF band is contained within a complete RF band, and where the partial RF band or the complete RF band is transmitted by a plurality of wireless nodes. Furthermore, the positioning capabilities indicate that the mobile device is configured to measure the at least one partial RF band and is not configured to measure the complete RF band. In one implementation, the mobile device may be capable of measuring the complete RF band; however, it may be configured, via a carrier, OEM, and/or user, to only measure a partial RF band within the complete RF band. In an aspect, the complete RF band may comprise an RF frequency range and the partial RF band may comprise a plurality of one or more non-overlapping RF frequency subranges, where each RF frequency subrange is contained within the RF frequency range. Block 510 may correspond to actions 204 and 205 in FIG. 2.

At block 520, the mobile device receives location assistance data from the location server, where the location assistance data comprises configuration information for at least one reference signal (RS) in the at least one partial RF band, and where the at least one RS is transmitted by at least one wireless node (e.g. a gNB 110, ng-eNB 114 or an eNB). In an aspect, the at least one RS may be a PRS, CRS or TRS. In an aspect, a bandwidth for the at least one RS is contained within the partial RF band. In an aspect, the at least one RS uses frequency hopping over the complete RF band, and the configuration information comprises positioning occasions for the at least one RS, where a bandwidth for each of the positioning occasions is contained within the partial RF band. Block 520 may correspond to actions 212 and 213 in FIG. 2.

At block 530, the mobile device obtains at least one location measurement from the at least one RS based on the configuration information. In an aspect, the at least one location measurement comprises a measurement of a reference signal time difference (RSTD), reference signal received power (RSRP), reference signal received quality (RSRQ), round trip signal propagation time (RTT), angle of arrival (AOA), time of arrival (TOA), angle of departure (AOD), or any combination thereof. Block 530 may correspond to block 216 in FIG. 2.

At block 540, the mobile device sends location information to the location server, where the location information is based on the at least one location measurement. For example, the location information may comprise the at least one location measurement. The location information may be used by the location server to a determine a location of the mobile device (e.g. as at block 219 in FIG. 2). In one implementation, the mobile device may determine its location based on the at least one location measurement and the location information provided to the location server is the mobile device's location. Block 540 may correspond to actions 217 and 218 in FIG. 2.

In an aspect of the example process 500, the partial RF band comprises one or more non-overlapping RF frequency subranges, where each RF frequency subrange comprises a plurality of one or more resource blocks (RBs), a plurality of one or more subcarriers (SCs), a plurality of one or more frequency ranges, or any combination thereof. In this aspect, the identification of the at least one partial RF band may comprise at least one of a bit string, a set of integers, a set of identifiers, or any combination thereof. In this aspect, the identification of the at least one partial RF band may include an identification of least one resource block (RB), an identification of at least one subcarrier (SC), an identification of at least one frequency range, an identification of a minimum frequency, an identification of a maximum frequency, an identification of an offset from a minimum frequency, an identification of an offset from a maximum frequency, or any combination thereof.

In another aspect, the example process 500 further comprises receiving a request for the positioning capabilities of the mobile device from the location server, where the positioning capabilities are sent to the location server at block 510 in response to the request.

Figure 6:
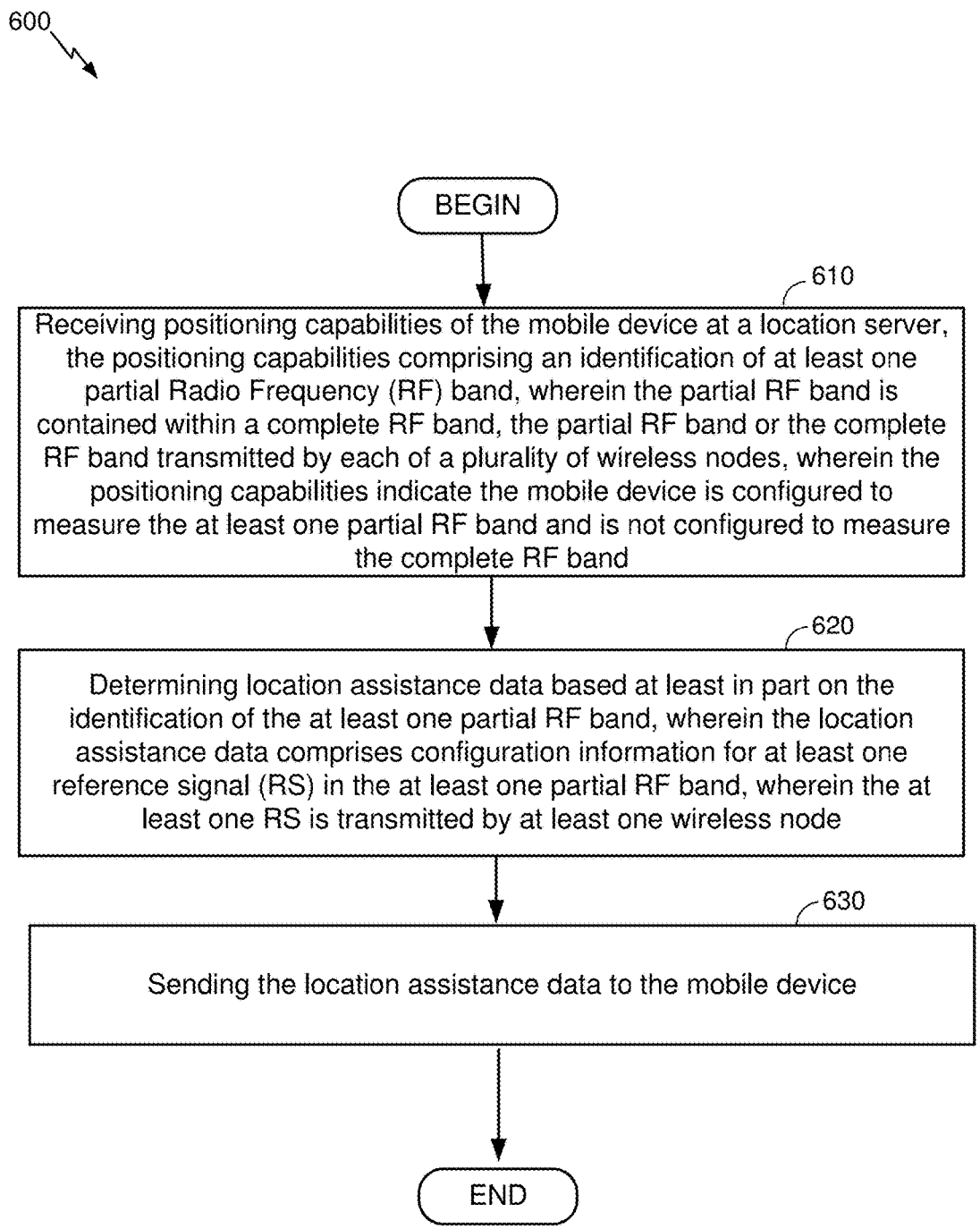
FIG. 6 is a flowchart of an example process, generally performed at a location server, to support location of a mobile device in accordance with the techniques and methods described herein.

FIG. 6 shows a flowchart of an example process 600 for locating a mobile device, generally performed at a location server, such as LMF 120, an E-SMLC or an SLP. Non-limiting examples of wireless access types that may be used in the implementations described herein may include Fifth Generation (5G) wireless access, New Radio (NR) wireless access, Long Term Evolution (LTE) wireless access, wireless local area connectivity (WLAN) (e.g. IEEE 802.11), etc.

At block 610, the location server receives positioning capabilities of the mobile device, where the positioning capabilities comprise an identification of at least one partial RF band, where the partial RF band is contained within a complete RF band, and where the partial RF band or the complete RF band is transmitted by each of a plurality of wireless nodes (e.g. gNBs 110, ng-eNB 114, eNBs), and where the positioning capabilities indicate the mobile device is configured to measure the at least one partial RF band and is not configured to measure the complete RF band. Block 610 may correspond to actions 204 and 205 in FIG. 2.

In one implementation, the location server may initially request positioning capabilities of the mobile device (prior to block 610), as at actions 202 and 203 in FIG. 2, and block 610 may be performed in response to the request for positioning capabilities.

At block 620, the location server determines location assistance data based at least in part on the identification of the at least one partial RF band, where the location assistance data comprises configuration information for at least one reference signal (RS) in the at least one partial RF band, and where the at least one RS is transmitted by at least one wireless node. The at least one RS may be a PRS, CRS or TRS. In an aspect, a bandwidth for the at least one RS is contained within the partial RF band. In an aspect, the at least one RS uses frequency hopping over the complete RF band, and the configuration information comprises positioning occasions for the at least one RS, where a bandwidth for each of the positioning occasions is contained within the partial RF band. Block 620 may correspond to block 211 in FIG. 2.

At block 630, the location server provides or sends the location assistance data to the mobile device. Block 630 may correspond to actions 212 and 213 in FIG. 2.

In an aspect, the example process 600 may further include receiving location information from the mobile device (e.g. as at action 218 in FIG. 2), where the location information is based at least in part on measurement of at least one RS by the mobile device. In this aspect, the location information may comprise a location measurement from the at least one RS, where the location measurement comprises a measurement of a reference signal time difference (RSTD), reference signal received power (RSRP), reference signal received quality (RSRQ), round trip signal propagation time (RTT), angle of arrival (AOA), time of arrival (TOA), angle of departure (AOD), or any combination thereof.

In an aspect of the example process 600, the partial RF band comprises one or more non-overlapping RF frequency subranges, where each RF frequency subrange comprises a plurality of one or more resource blocks (RBs), a plurality of one or more subcarriers (SCs), a plurality of one or more frequency ranges, or any combination thereof. In this aspect, the identification of the at least one partial RF band may comprise at least one of a bit string, a set of integers, a set of identifiers, or any combination thereof. In this aspect, the identification of the at least one partial RF band may include an identification of least one RB, an identification of at least one SC, an identification of at least one frequency range, an identification of a minimum frequency, an identification of a maximum frequency, an identification of an offset from a minimum frequency, an identification of an offset from a maximum frequency, or any combination thereof.

According to an aspect of the disclosure, the location server may coordinate with one or more wireless nodes (e.g. gNBs 110, ng-eNB 114, eNB) to obtain location related information, as at actions 207-210 in FIG. 2. The location related information may be used to determine assistance data to support a plurality of devices in the area and may not be applicable to every device in the area. The location server may send the determined assistance data to the mobile device at block 630 and may provide indications or identifiers, to the mobile device, indicating which portions of the provided assistance data may be relevant to the mobile device. For example, if the mobile device indicates it is configured to use or measure 2600 MHz to 2620 MHz, then the location server may indicate that only certain RS or PRS configurations in the assistance data within this frequency range are applicable to the mobile device.

Figure 7:
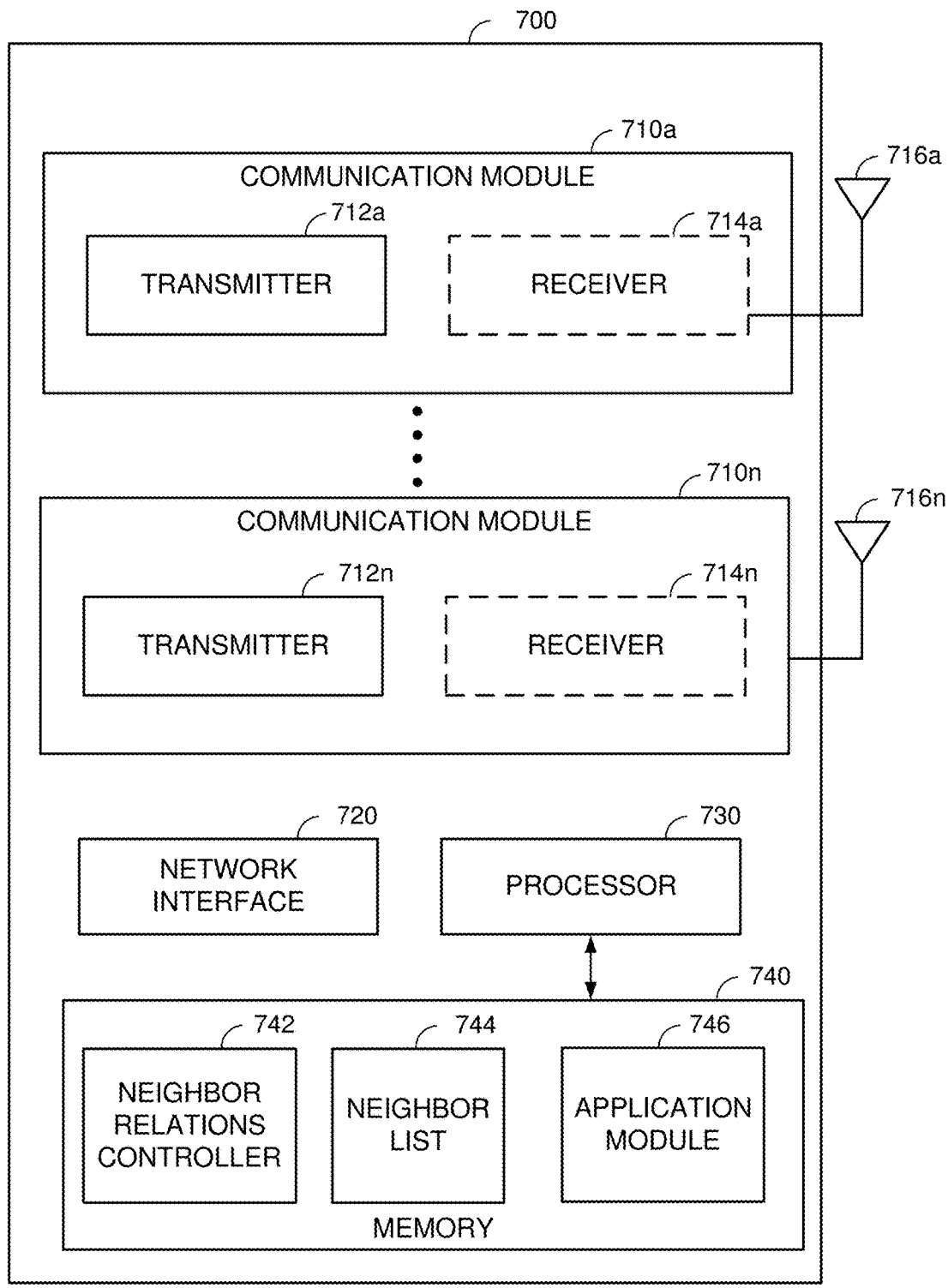
FIG. 7 is a block diagram of an example wireless or wireline node (such as a base station, access point, or server).

FIG. 7 shows a block diagram of an example wireless node 700, such as a base station, access point, or server, which may be similar to, and be configured to have a functionality similar to that, of any of the various nodes depicted or described, for example, with reference to FIG. 1 (e.g., the gNBs 110-1, 110-2, 110-3, an ng-eNB 114, an eNB, an LMF 120, other components of the 5GCN 140). The wireless node 700 may include one or more communication modules 710a-n electrically coupled to one more antennas 716a-n for communicating with wireless devices, such as, for example, the UE 105 of FIG. 1. The each of the communication modules 710a-710n may include a respective transmitter 712a-n for sending signals (e.g., downlink messages and signals, which may be arranged in frames, and which may include positioning reference signals and/or assistance data as described herein) and, optionally (e.g., for nodes configured to receive and process uplink communications) a respective receiver 714a-n. In embodiments in which the implemented node includes both a transmitter and a receiver, the communication module comprising the transmitter and receiver may be referred to as a transceiver. The node 700 may also include a network interface 720 to communicate with other network nodes (e.g., sending and receiving queries and responses). For example, each network element may be configured to communicate (e.g., via wired or wireless backhaul communication) with a gateway, or other suitable device of a network, to facilitate communication with one or more core network nodes (e.g., any of the other nodes and elements shown in FIG. 1). Additionally and/or alternatively, communication with other network nodes may also be performed using the communication modules 710a-n and/or the respective antennas 716a-n.

The node 700 may also include other components that may be used with embodiments described herein. For example, the node 700 may include, in some embodiments, a processor (also referred to as a controller) 730 to manage communications with other nodes (e.g., sending and receiving messages), to generate communication signals (including to generate communication frames, signals and/or messages such as PRS transmissions and assistance data transmissions), and to provide other related functionality, including functionality to implement the various processes and methods described herein.

The processor 730 may be coupled to (or may otherwise communicate with) a memory 740, which may include one or more modules (implemented in hardware of software) to facilitate controlling the operation of the node 700. For example, the memory 740 may include an application module 746 with computer code for various applications required to perform the operations of the node 700. For example, the processor 730 may be configured (e.g., using code provided via the application module 746, or some other module in the memory 740) to control the operation of the antennas 716a-n so as to adjustably control the antennas' transmission power and phase, gain pattern, antenna direction (e.g., the direction at which a resultant radiation beam from the antennas 716a-n propagates), antenna diversity, and other adjustable antenna parameters for the antennas 716a-n of the node 700. In some embodiments, the antennas' configuration may be controlled according to pre-stored configuration data provided at the time of manufacture or deployment of the node 700, or according to data obtained from a remote device (such as a central server sending data representative of the antenna configuration, and other operational parameters, that are to be used for the node 700). The wireless node 700 may also be configured, in some implementations, to perform location data services, or performs other types of services, for multiple wireless devices (clients) communicating with the wireless node 700 (or communicating with a server coupled to the wireless node 700), and to provide location data and/or assistance data to such multiple wireless devices. Means for performing the functionality at block 610, 620 and/or 630 can include, for example, the processors 730, network interface 720, one or more communication modules 710a-n, memory 740, neighbor relations controller 742, and/or neighbor list 744.

In addition, in some embodiments, the memory 740 may also include neighbor relations controllers (e.g., neighbor discovery modules) 742 to manage neighbor relations (e.g., maintaining a neighbor list 744) and to provide other related functionality. In some embodiments, the node 700 may also include one or more sensors (not shown in FIG. 7) and other devices (e.g., cameras).

Figure 8:
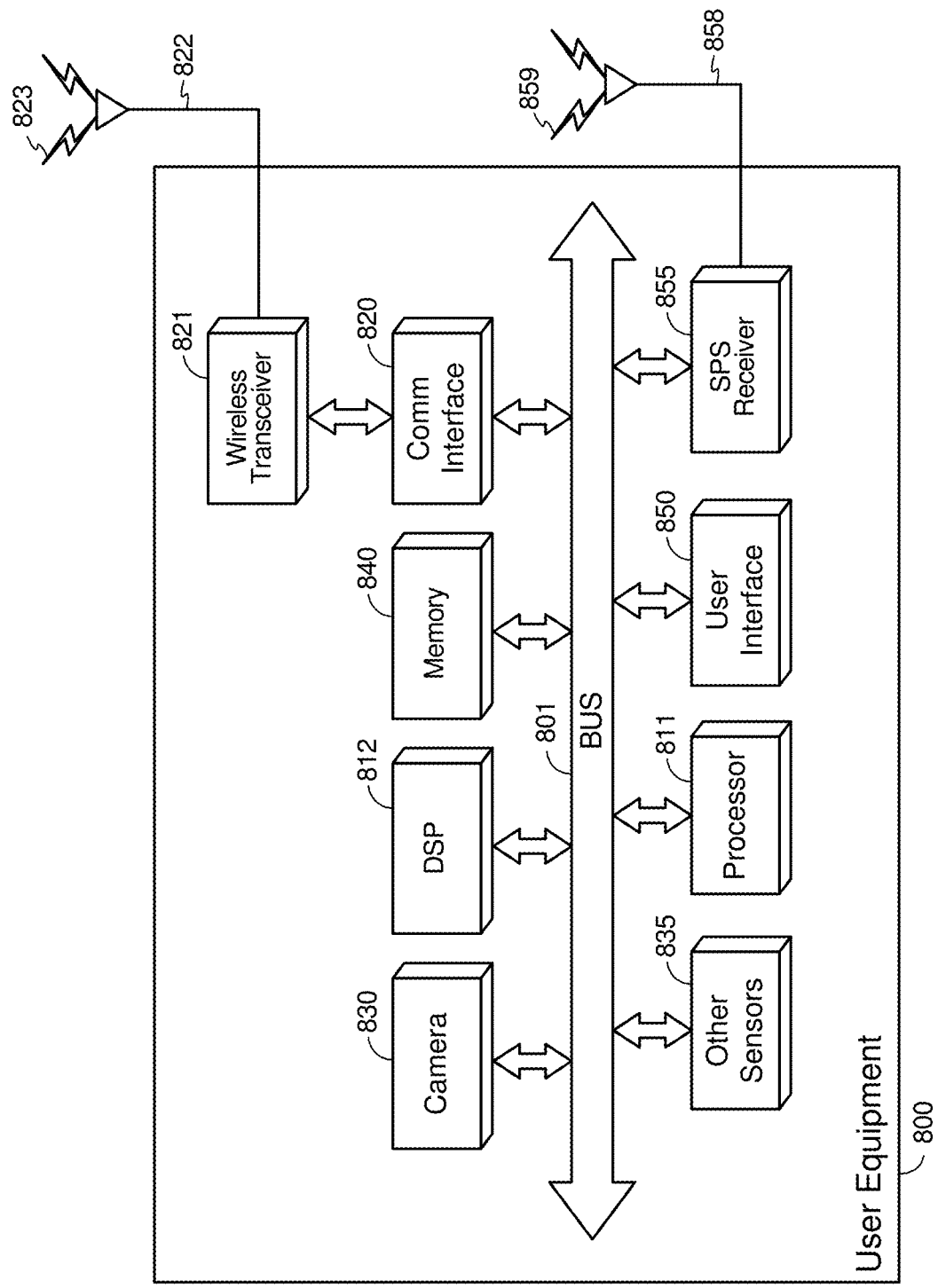
FIG. 8 is a block diagram of a mobile device.

FIG. 8 shows a user equipment (UE) 800 for which various procedures and techniques described herein can be utilized. The UE 800 may be similar or identical, in implementation and/or functionality, to any of the other UEs described herein, including the UE 105 depicted in FIG. 1 and the mobile device referred to for FIGS. 6 and 7. Furthermore, the implementation illustrated in FIG. 8 may also be used to implement, at least in part, some of the nodes and devices illustrated throughout the present disclosure, including such nodes and devices and the base stations (e.g. gNBs 110, ng-eNB 114, etc.), location servers, and other components and devices illustrated in FIG. 1 and FIG. 7.

The UE 800 includes a processor 811 (or processor core) and memory 840. The UE 800 may optionally include a trusted environment operably connected to the memory 840 by a public bus 801 or a private bus (not shown). The UE 800 may also include a communication interface 820 and a wireless transceiver 821 configured to send and receive wireless signals 823 (which may include LTE, NR, 5G or WiFi wireless signals) via a wireless antenna 822 over a wireless network (such as the communication system 100 of FIG. 1). The wireless transceiver 821 is connected to the bus 801 via the communication interface 820. Here, the UE 800 is illustrated as having a single wireless transceiver 821. However, the UE 800 can alternatively have multiple wireless transceivers 821 and/or multiple wireless antennas 822 to support multiple communication standards such as WiFi, CDMA, Wideband CDMA (WCDMA), Long Term Evolution (LTE), 5G, NR, Bluetooth® short-range wireless communication technology, etc. As described earlier herein, wireless transceiver 821 may support (e.g. may be configured to support) one or more partial RF bands and may not support one or more associated complete RF bands. In such a case, UE 800 may use one or more of the embodiments described herein (e.g. the example process 500) to enable a location of the UE 800 to be obtained by the UE 800 or by a location server (e.g. the LMF 120 in FIG. 1).

Means for performing the functionality at block 510 and/or block 540 can include, for example, the processor 811, memory 840, wireless transceiver 821, communication interface 820 and/or wireless antennas 822.

The communication interface 820 and/or wireless transceiver 821 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 800 may also include a user interface 850 (e.g., display, graphical user interface (GUI), touchscreen, keyboard, microphone, speaker), and a Satellite Positioning System (SPS) receiver 855 that receives SPS signals 859 (e.g., from SPS satellites) via an SPS antenna 858 (which may be the same antenna as wireless antenna 822, or may be different). The SPS receiver 855 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 855 measures the SPS signals 859 and may use the measurements of the SPS signals 859 to determine the location of the UE 800. The processor 811, memory 840, Digital Signal Processor (DSP) 812 and/or specialized processor(s) (not shown) may also be utilized to process the SPS signals 859, in whole or in part, and/or to compute (approximately or more precisely) the location of the UE 800, in conjunction with SPS receiver 855. Alternatively, the UE 800 may support transfer of the SPS measurements to a location server (e.g., E-SMLC, an LMF, such as the LMF 120 of FIG. 1, etc.) that computes the UE location instead. Storage of information from the SPS signals 859 or other location signals is performed using a memory 840 or registers (not shown). While only one processor 811, one DSP 812 and one memory 840 are shown in FIG. 8, more than one of any, a pair, or all of these components could be used by the UE 800. The processor 811 and the DSP 812 associated with the UE 800 are connected to the bus 801. Means for performing the functionality at block 520 and/or block 530 can include, for example, the processors 811, memory 840, wireless transceiver 821, communication interface 820, wireless antennas 822, DSP 812, SPS receiver 855, and/or SPS antenna 858.

The memory 840 can include a non-transitory computer-readable storage medium (or media) that stores functions as one or more instructions or code. Media that can make up the memory 840 include, but are not limited to, RAM, ROM, FLASH, disc drives, etc. In general, the functions stored by the memory 840 are executed by general-purpose processor (s), such as the processor 811, specialized processors, such as the DSP 812, etc. Thus, the memory 840 is a processor-readable memory and/or a computer-readable memory that stores software (programming code, instructions, etc.) configured to cause the processor(s) 811 and/or DSP(s) 812 to perform the functions described (e.g. the functions described previously for the example process 500 of FIG. 5). Alternatively, one or more functions of the UE 800 may be performed in whole or in part in hardware.

A UE 800 can estimate its current position within an associated system using various techniques, based on other communication entities within radio range and/or information available to the UE 800. For instance, the UE 800 can estimate its position using information obtained from: base stations and access points (APs) associated with one or more wireless wide area networks (WWANs), wireless local area networks (WLANs), personal area networks (PANs) utilizing a short-range wireless communication technology such as Bluetooth® wireless technology or ZIGBEE®, etc.; Global Navigation Satellite System (GNSS) or other Satellite Positioning System (SPS) satellites; and/or map data obtained from a map server or other server (e.g., an LMF, an E-SMLC or SLP). In some cases, a location server, which may be an E-SMLC, SLP, Standalone Serving Mobile Location Center (SAS), an LMF, etc., may provide assistance data to the UE 800 to allow or assist the UE 800 to acquire signals (e.g., signals from WWAN base stations, signals from WLAN APs, signals from cellular base stations, GNSS satellites, etc.) and make location-related measurements using these signals. The UE 800 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites, configuration parameters for the PRS signals, the precise location coordinates of WLAN APs and/or cellular base stations, etc.)

In some embodiments, the UE 800 may include a camera 830 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 830 may be configured to obtain and provide image information to assist in positioning of the UE 800. In an example, one or more external image processing servers (e.g., remote servers) may be used to perform image recognition and provide location estimation processes. The UE 800 may include other sensors 835 which may also be used to compute, or used to assist in computing, a location for the UE 800. The sensors 835 may include inertial sensors (e.g., accelerometers, gyroscopes, magnetometers, a compass, any of which may be implemented based on micro-electro-mechanical-system (MEMS), or based on some other technology), as well as a barometer, thermometer, hygrometer and other sensors.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for location determination at a mobile device, the method comprising:
   sending positioning capabilities of the mobile device to a location server, the positioning capabilities comprising an identification of at least one partial Radio Frequency (RF) band, wherein the partial RF band is contained within a complete RF band, the partial RF band or the complete RF band transmitted by a plurality of wireless nodes, wherein the positioning capabilities indicate that the mobile device is configured to measure the at least one partial RF band and is not configured to measure the complete RF band;
   receiving location assistance data from the location server, wherein the location assistance data comprises configuration information for at least one reference signal (RS) in the at least one partial RF band, wherein the at least one RS is transmitted by at least one wireless node;
   obtaining at least one location measurement from the at least one RS based on the configuration information; and
   sending location information to the location server, wherein the location information is based on the at least one location measurement.

2. The method of claim 1, wherein the at least one location measurement comprises a measurement of a reference signal time difference (RSTD), reference signal received power (RSRP), reference signal received quality (RSRQ), round trip signal propagation time (RTT), angle of arrival (AOA), time of arrival (TOA), angle of departure (AOD), or any combination thereof.

3. The method of claim 1, wherein the at least one RS is a positioning reference signal (PRS).

4. The method of claim 1, wherein a bandwidth for the at least one RS is contained within the partial RF band.

5. The method of claim 1, wherein the at least one RS uses frequency hopping over the complete RF band, the configuration information comprises positioning occasions for the at least one RS, wherein a bandwidth for each of the positioning occasions is contained within the partial RF band.

6. The method of claim 1, wherein the partial RF band comprises one or more non-overlapping RF frequency subranges, wherein each of the non-overlapping RF frequency subranges comprises a plurality of one or more resource blocks (RBs), a plurality of one or more subcarriers (SCs), one or more frequency ranges, or any combination thereof.

7. The method of claim 6, wherein the identification of the at least one partial RF band comprises at least one of a bit string, a set of integers, a set of identifiers, or any combination thereof.

8. The method of claim 7, wherein the identification of the at least one partial RF band includes an identification of least one resource block (RB), an identification of at least one subcarrier (SC), an identification of at least one frequency range, an identification of a minimum frequency, an identification of a maximum frequency, an identification of an offset from a minimum frequency, an identification of an offset from a maximum frequency, or any combination thereof.

9. The method of claim 1, further comprising: receiving a request for the positioning capabilities of the mobile device from the location server, wherein the positioning capabilities are sent to the location server in response to the request.

10. A mobile device comprising:
    a memory;

one or more transceivers, the one or more transceivers configured to:
  send positioning capabilities of the mobile device to a location server, the positioning capabilities comprising an identification of at least one partial Radio Frequency (RF) band, wherein the partial RF band is contained within a complete RF band, the partial RF band or the complete RF band transmitted by a plurality of wireless nodes, wherein the positioning capabilities indicate that the mobile device is configured to measure the at least one partial RF band and is not configured to measure the complete RF band;
  receive location assistance data from the location server, wherein the location assistance data comprises configuration information for at least one reference signal (RS) in the at least one partial RF band, wherein the at least one RS is transmitted by at least one wireless node;
one or more processors coupled to the memory and the one or more transceivers, the one or more processors configured to:
  obtain at least one location measurement from the at least one RS based on the configuration information; and
  send, via the one or more transceivers, location information to the location server, wherein the location information is based on the at least one location measurement.

11. The mobile device of claim 10, wherein the at least one location measurement comprises a measurement of a reference signal time difference (RSTD), reference signal received power (RSRP), reference signal received quality (RSRQ), round trip signal propagation time (RTT), angle of arrival (AOA), time of arrival (TOA), angle of departure (AOD), or any combination thereof.

12. The mobile device of claim 10, wherein the at least one RS is a positioning reference signal (PRS).

13. The mobile device of claim 10, wherein a bandwidth for the at least one RS is contained within the partial RF band.

14. The mobile device of claim 10, wherein the at least one RS uses frequency hopping over the complete RF band, the configuration information comprises positioning occasions for the at least one RS, wherein a bandwidth for each of the positioning occasions is contained within the partial RF band.

15. The mobile device of claim 10, wherein the partial RF band comprises one or more non-overlapping RF frequency subranges, wherein the RF frequency subrange comprises a plurality of one or more resource blocks (RBs), a plurality of one or more subcarriers (SCs), one or more frequency ranges, or any combination thereof.

16. The mobile device of claim 15, wherein the identification of the at least one partial RF band comprises at least one of a bit string, a set of integers, a set of identifiers, or any combination thereof.

17. The mobile device of claim 16, wherein the identification of the at least one partial RF band includes an identification of least one resource block (RB), an identification of at least one subcarriers (SC), an identification of at least one frequency range, an identification of a minimum frequency, an identification of a maximum frequency, an identification of an offset from a minimum frequency, an identification of an offset from a maximum frequency, or any combination thereof.

18. The mobile device of claim 10, the one or more transceiver further configured to receive a request for the positioning capabilities of the mobile device from the location server, wherein the positioning capabilities are sent to the location server in response to the request.

19. A mobile device for location determination, the mobile device comprising:
  means for sending positioning capabilities of the mobile device to a location server, the positioning capabilities comprising an identification of at least one partial Radio Frequency (RF) band, wherein the partial RF band is contained within a complete RF band, the partial RF band or the complete RF band transmitted by a plurality of wireless nodes, wherein the positioning capabilities indicate that the mobile device is configured to measure the at least one partial RF band and is not configured to measure the complete RF band;
  means for receiving location assistance data from the location server, wherein the location assistance data comprises configuration information for at least one reference signal (RS) in the at least one partial RF band, wherein the at least one RS is transmitted by at least one wireless node;
  means for obtaining at least one location measurement from the at least one RS based on the configuration information; and
  means for sending location information to the location server, wherein the location information is based on the at least one location measurement.

20. The mobile device of claim 19, wherein the at least one location measurement comprises a measurement of a reference signal time difference (RSTD), reference signal received power (RSRP), reference signal received quality (RSRQ), round trip signal propagation time (RTT), angle of arrival (AOA), time of arrival (TOA), angle of departure (AOD), or any combination thereof.

21. The mobile device of claim 19, wherein the at least one RS is a positioning reference signal (PRS).

22. The mobile device of claim 19, wherein a bandwidth for the at least one RS is contained within the partial RF band.

23. The mobile device of claim 19, wherein the at least one RS uses frequency hopping over the complete RF band, the configuration information comprises positioning occasions for the at least one RS, wherein a bandwidth for each of the positioning occasions is contained within the partial RF band.

24. The mobile device of claim 19, wherein the partial RF band comprises one or more non-overlapping RF frequency subranges, wherein the RF frequency subrange comprises a plurality of one or more resource blocks (RBs), a plurality of one or more subcarriers (SCs), one or more frequency ranges, or any combination thereof.

25. The mobile device of claim 24, wherein the identification of the at least one partial RF band comprises at least one of a bit string, a set of integers, a set of identifiers, or any combination thereof.

26. The mobile device of claim 25, wherein the identification of the at least one partial RF band includes an identification of least one resource block (RB), an identification of at least one subcarriers (SC), an identification of at least one frequency range, an identification of a minimum frequency, an identification of a maximum frequency, an identification of an offset from a minimum frequency, an identification of an offset from a maximum frequency, or any combination thereof.

27. The mobile device of claim 19, further comprising means for receiving a request for the positioning capabilities of the mobile device from the location server, wherein the positioning capabilities are sent to the location server in response to the request.

28. A non-transitory computer-readable medium for location determination at a mobile device comprising processor-executable program code configured to cause one or more processors to:
  send positioning capabilities of the mobile device to a location server, the positioning capabilities comprising an identification of at least one partial Radio Frequency (RF) band, wherein the partial RF band is contained within a complete RF band, the partial RF band or the complete RF band transmitted by a plurality of wireless nodes, wherein the positioning capabilities indicate that the mobile device is configured to measure the at least one partial RF band and is not configured to measure the complete RF band;
  receive location assistance data from the location server, wherein the location assistance data comprises configuration information for at least one reference signal (RS) in the at least one partial RF band, wherein the at least one RS is transmitted by at least one wireless node;
  obtain at least one location measurement from the at least one RS based on the configuration information; and
  send location information to the location server, wherein the location information is based on the at least one location measurement.

29. The non-transitory computer-readable medium of claim 28, wherein the partial RF band comprises one or more non-overlapping RF frequency subranges, wherein the RF frequency subrange comprises a plurality of one or more resource blocks (RBs), a plurality of one or more subcarriers (SCs), one or more frequency ranges, or any combination thereof.

30. The non-transitory computer-readable medium of claim 29, wherein the identification of the at least one partial RF band comprises at least one of a bit string, a set of integers, a set of identifiers, or any combination thereof.

* * * * *